3,557,230
PRODUCTION OF CHLOROMETHANES
Bruce E. Kurtz, Marcellus, and Robert H. Fitch, Syracuse, N.Y., assignors to Allied Chemical Corporation, New York, N.Y., a corporation of New York
Filed May 5, 1969, Ser. No. 821,655
Int. Cl. C07c 17/00
U.S. Cl. 260—657                                   5 Claims

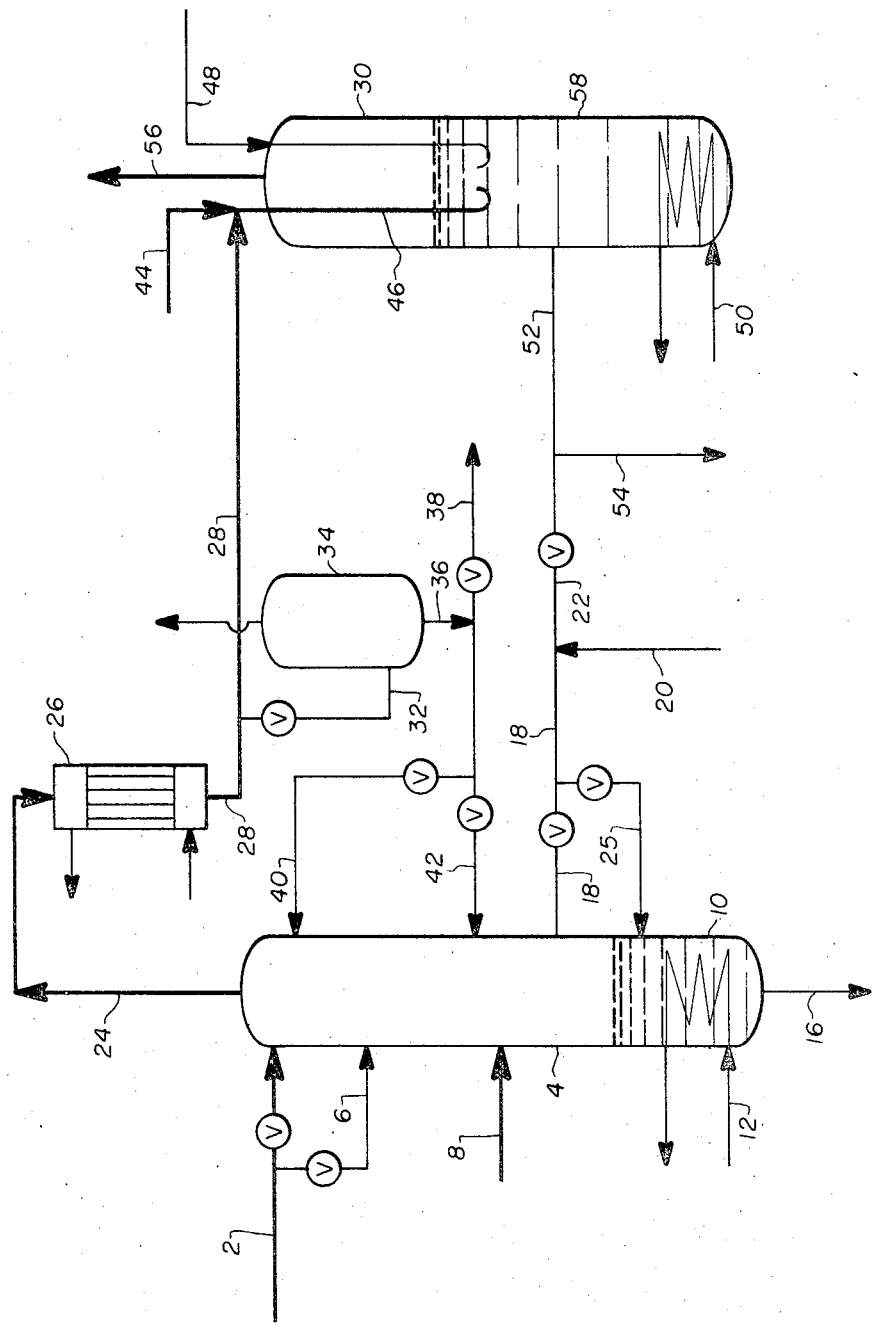

ABSTRACT OF THE DISCLOSURE

This invention relates to the preparation of chloromethanes from methyl chloromethyl ether by reacting at elevated temperatures methyl chloromethyl ether with hydrogen chloride in the presence of an ether-cleaving agent comprising chlorosulfonic acid preferably having dissolved therein a minor amount of mercury. The methyl chloromethyl ether is prepared by reacting essentially equimolar proportions of methyl alcohol and formaldehyde and contacting this mixture in countercurrent relationship with hydrogen chloride in a reaction vessel at elevated temperatures.

---

This invention relates to the preparation of chloromethanes from methyl chloromethyl ether. Specifically, the present invention relates to the preparation of methyl chloride and methylene chloride from methyl chloromethyl ether. A further aspect of the present invention relates to an integrated process for the preparation of chloromethanes from methanol and formaldehyde.

It is well known to produce the chlorides of methane, such as methyl chloride, methylene chloride, chloroform and carbon tetrachloride, by chlorinating methane or methyl chloride or mixtures of these compounds. Generally, the reaction involves a substitution of chlorine for hydrogen in the methane or methyl chloride molecule with the formation of the chlorides of methane along with the simultaneous production of hydrogen chloride in an amount equivalent to about half the chlorine supplied to the process. It is evident that an undesirable feature of the known process is the simultaneous production of the relatively worthless compound HCl, which often has little or no value and may even incur an economic penalty in the form of the disposal costs, involving elaborate equipment required in the hydrogen chloride recovery system.

It is also well known in the art to produce methyl chloride by reacting methanol and hydrogen chloride. Inasmuch as hydrogen chloride is consumed in this process, the foregoing processes can be combined in such a manner as to produce methyl chloride without by-product hydrogen chloride. This combination process consists of the combination of thermal chlorination of methane and/or methyl chloride with chlorine and the hydrochlorination of methanol employing the hydrogen chloride by-product from the chlorination.

Alternatively, attempts have been made to prepare chloromethanes from methyl chloromethyl ether by reacting the ether with an excess of hydrogen chloride to form methyl chloride and methylene chloride. However, the addition of an excess of hydrogen chloride combined with a long retention time, which is required, produces only small yields of methyl chloride and methylene chloride.

It has now been found that methyl chloromethyl ether may be reacted with hydrogen chloride to produce quantitative yields of methyl chloride and methylene chloride by employing a catalyst system comprising chlorosulfonic acid, which may contain free sulfur trioxide and preferably having dissolved therein minor amounts of mercury as a promoter. It has been found that by dissolving a minor amount of mercury in chlorosulfonic acid containing up to about 20%, preferably up to 3% by weight free sulfur trioxide, and contacting methyl chloromethyl ether with hydrogen chloride in the presence of this catalyst system at elevated temperatures, there results an essentially quantitative conversion of the methyl chloromethyl ether to methyl chloride and methylene chloride.

FIG. 1 is a schematic diagram of the process of the present invention.

The methyl chloromethyl ether employed may be prepared by any known method. For instance, hydrogen chloride may be passed into a vessel containing an equimolar mixture of methanol and formaldehyde with or without water until the mixture is saturated with hydrogen chloride and thereafter separating the aqueous and organic layers of the reaction mixture. Methyl chloromethyl ether is then separated from the organic phase. This method, however, has the disadvantage that the yield of methyl chloromethyl ether is lower than that desired in a commercially operable process. A considerable part of the methyl chloromethyl ether produced remains in the aqueous phase which requires distilling the aqueous phase resulting in decomposition of the methyl chloromethyl ether to methanol and formaldehyde, which in turn reacts under the distillation conditions to form methylal, which then has to be recycled to the reactor to reform methyl chloromethyl ether. It has also be suggested to reduce losses of methyl chloromethyl ether in the above process by adding calcium chloride to the reaction mixture thus reducing the solubility of the methyl chloromethyl ether in the aqueous phase. However, this involves the added expense of the cost of the calcium chloride employed.

In the preferred process of the present invention, methyl chloromethyl ether is produced in high yields and good purity by contacting a mixture containing formaldehyde and methanol, preferably in equimolar amounts, with hydrogen chloride in countercurrent relationship to form in a continuous manner methyl chloromethyl ether. This may be readily accomplished, for instance, by introducing a solution of the methanol and formaldehyde at or near the top of a column equipped with suitable contact means, e.g., bubble cap trays, packed columns and the like, to provide for repeated contact of the relatively large amount of liquid with the vaporous hydrogen chloride to insure an efficient contact of the hydrogen chloride as it rises through the reaction vessel. As the reaction mixture of methanol and formaldehyde is contacted with the hydrogen chloride, methyl chloromethyl ether is formed. The methyl chloromethyl ether may be easily separated from the aqueous phase and removed in the overhead fraction while withdrawing excess water from the bottom of the reactor. The methyl chloromethyl ether is in good state of purity for subsequent conversion to methyl chloride and methylene chloride or recovered and stored for subsequent use.

The reaction vessel is preferably equipped with a reboiler located at the bottom of the reaction column wherein the reboiler supplies heat to the column and continuously generates a stream of hydrogen chloride, organics and water vapors which pass up the column. By adjusting the boil-up rate properly it is possible to prevent any appreciable amount of methyl chloromethyl ether from leaving the column in a stream drawn from the reboiler. This stream consists of the water formed during the course of the reaction, plus a certain amount of dissolved hydrogen chloride corresponding to a water-hydrogen chloride azeotrope.

The vapors leaving the top of the column will generally be methyl chloromethyl ether containing small amounts of water. The water may be removed by providing at the top of the column a reflux condenser. The liquid reflux can be recycled to the reactor column while removing the stream of essentially methyl chloromethyl ether vapors. The vapors can be introduced directly into the reactor which converts the methyl chloromethyl ether to methyl chloride and methylene chloride or alternatively, the methyl chloromethyl ether may be removed from the system and stored.

The methanol and formaldehyde may be either a mixture or solution of aqueous formaldehyde and methanol, or a solution of formaldehyde in methanol in which the formaldehyde is solubilized by addition of a small amount of acid (e.g., HCl) or base (e.g., NaOH). The aqueous solution of formaldehyde and methanol may be prepared by employing commercially available formaldehyde solutions generally containing about 34% to approximately 37% formaldehyde. The formaldehyde and methanol may be mixed together in equimolar amounts, preferably, however, with a slight stoichiometric excess, i.e., about 5 to 10%, of methanol being present. Alternatively, the solution of formaldehyde and methanol may be prepared by passing formaldehyde vapors into methanol or by dissolving solid paraformaldehyde, polyoxymethylene or trioxymethylene in methanol and then de-polymerizing the formaldehyde source with alkaline depolymerization agent; e.g., sodium hydroxide, potassium hydroxide or the like.

The temperature employed in the reaction zone for preparing methyl chloromethyl ether may vary from about 30° up to about 80° C., preferably 40° to 60° C., for the column overhead temperature and temperatures of about 80° to 150° C., preferably 100° to 120° C. for the reboiler. Pressures in the reaction zone may be either atmospheric or superatmospheric. However, atmospheric pressure is preferred because there is no need for the use of high pressure equipment.

The conversion of methyl chloromethyl ether to methyl chloride and methylene chloride may be conducted either in a vapor or liquid state. However, it is preferred that the methyl chloromethyl ether be in the vapor state. The reaction may be conducted either batchwise or in a continuous manner. In the later method the methyl chloromethyl ether and the hydrogen chloride are reacted in the presence of the chlorosulfonic acid, which may contain free sulfur trioxide, preferably also containing dissolved mercury at a temperature of about 80° to 250° C., preferably about 90° to 200° C., by injecting the methyl chloromethyl ether and hydrogen chloride into the chlorosulfonic acid solution or; alternatively, by passing the methyl chloromethyl ether and hydrogen chloride in the form of a vapor in contact with the chlorosulfonic acid either co-currently or countercurrently thereto in a suitable reaction tower, e.g., packed tower, to effect contact between the reactants and acid catalyst.

The chlorosulfonic acid is prepared by mixing sulfur trioxide and hydrogen chloride prior to contacting with methyl chloromethyl ether. Free sulfur trioxide may be present in an excess up to about 20%; preferably, however, the free sulfur trioxide in the chlorosulfonic acid does not exceed 3%, by weight. The chlorosulfonic acid may be either liquid or vapor when introduced into the cleaving vessel. Since sulfuric acid is a by-product in the preparation of the chloromethanes using the chlorosulfonic acid catalyst, sulfuric acid may be used as the medium into which the chlorosulfonic acid, methyl chloromethyl ether and hydrogen chloride are introduced. There is substantially no conversion of the ether to the chloromethanes in the presence of sulfuric acid, per se.

The presence of a minor amount of mercury dissolved, i.e. soluble or dispersible, in the chlorosulfonic acid medium has been found beneficial in effecting quantitative yields of the methyl chloride and methylene chloride from the methyl chloromethyl ether. The concentration of mercury dissolved in the chlorosulfonic acid may vary over a wide range of limits. The mercury may be present in an amount ranging from about one part per million up to an amount at which the mercury is no longer dissolved in the chlorosulfonic acid, i.e., its saturation point, with a practical upper limit being approximately 100,000 parts per million (10% by weight). A preferred amount of mercury may be from approximately about 10 to 1000 parts per million, with up to about 500 parts per million being an especially preferred amount of mercury dissolved in the chlorosulfonic acid. The mercury may be added to the chlorosulfonic acid in any desirable form. However, it is particularly preferred that the mercury be added in the form of one of its salts which upon mixing with the chlorosulfonic acid permtis dissolution of the metal in the acid in the desired amount. Exemplary of suitable mercury salts which may be employed include the acetates, benzoates, bromates, bromides, carbonates, chlorates, chlorides, chromates, formates, iodates, iodides, nitrates, oxalates, sulfates and sulfides.

Theoretically, for cleaving each mole of methyl chloromethyl ether there is required 1 mole each of the hydrogen chloride and chlorosulfonic acid. In the practice of the present invention for each mole of methyl chloromethyl ether the hydrogen chloride and chlorosulfonic acid may be present as follows:

Hydrogen chloride: 1.00 to 1.50, preferably 1.10 to 1.40 moles.

Chlorosulfonic acid: 1.00 to 1.40, preferably 1.05 to 1.30 moles.

In order to better understand the operation of the present invention reference is made to the attached schematic drawing of a flow diagram, designated FIG. 1, illustrating a procedure for preparing methyl chloride and methylene chloride by the integrated process of the present invention.

In FIG. 1, a mixture comprising approximately equimolar amounts of methanol and formaldehyde is introduced into column 4 via line 2. Column 4 may be any contact chamber equipped with suitable means for repeated contacting of vaporous hydrogen chloride with the liquid formaldehyde-methanol mixture in countercurrent relationship. Optionally, the mixture of methanol and formaldehyde may be introduced into column 4 at a point slightly below the top of the column via line 6. Hydrogen chloride is introduced into column 4 via line 8 at some point which is lower than the line introducing the methanol-formaldehyde mixture into column 4. Preferably, the hydrochloric acid is introduced into column 4 mid-way between the top and bottom of column 4. At the bottom of column 4 is provided a reboiler section 10 which supplies heat to the column, such as by the addition of steam through heat exchange element 12. By adjusting the boil-up rate in the reboiler, it is possible to prevent any significant amount of methyl chloromethyl ether from leaving the column by generating a stream of hydrogen chloride, organics and water vapor which pass up the column. The stream drawn from the reboiler via line 16 comprises essentially the water formed in the course of the reaction, plus a certain amount of dissolved hydrogen chloride corresponding to the composition of the water-hydrogen chloride azeotrope.

The loss of hydrogen chloride by withdrawal of the water-hydrogen chloride azeotrope from the reboiler may be minimized by adding sulfuric acid in an amount varying between 5 to 50%, preferably 10 to 30%, by weight of the water-hydrogen chloride azeotrope mixture. The sulfuric acid may be added to column 4 either via lines 20 and 18 or by line 20, 18 and 25. Alternatively, the by-product sulfuric acid produced in the conversion of the methyl chloromethyl ether to methyl chloride and methylene chloride, after removal of any dissolved mercury, maybe removed from vessel 30 via line 52 and introduced into column 4 by lines 22 and 18 or by lines 22, 18 and 25.

The vapors leaving the top of column 4 by line 24 comprise predominantly methyl chloromethyl ether containing a small amount of water. This overhead fraction is introduced to a reflux condenser 26 via line 24. The stream of methyl chloromethyl ether leaving reflux condenser 26 can be introduced directly into reactor 30 via line 28 for conversion of the methyl chloromethyl ether to methyl chloride and methylene chloride. A side stream of the methyl chloromethyl ether leaving reflux condenser 26 may be passed by lines 28 and 32 to reflux accumulator 34 for further purification and removed from the system via lines 36 and 38. Alternatively, the liquid methyl chloromethyl ether may be removed from accumulator 34 via line 36 and introduced into column 4 either by line 40 or 42.

The methyl chloromethyl ether vapor removed from the reflux condenser 26 is introduced into reaction vessel 30 for conversion to methyl chloride and methylene chloride. To accomplish this the methyl chloromethyl ether is mixed with at least one mol of hydrogen chloride per mole of ether introduced into line 28 via line 44 and this mixture is passed into reaction vessel 30 containing chlorosulfonic acid, preferably having dissolved therein a minor amount of mercury. The mixture of methyl chloromethyl ether and hydrogen chloride is introduced into the vessel by sparger pipe 46 which extends below the level of chlorosulfonic acid in reaction vessel 30. The chlorosulfonic acid is introduced into reaction vessel 30 by means of sparger pipe 48 at a rate which is equivalent to at least one mole of acid per mole of ether introduced. This rate is equal to the rate of by-product sulfuric acid which is removed from vessel 30 via line 52. The heat evolved in this reaction may be removed by any cooling means, such as cooling coils 50, to maintain a temperature in the chlorosulfonic acid bath of approximately 80° to 250° C. The methyl chloride and methylene chloride products are removed from reaction vessel 30 via line 56 in the form of vapors from which they may be recovered.

Sulfuric acid which is produced during the course of the reaction is removed through overflow lines 52 and 54. As mentioned above, this sulfuric acid may be employed in reactor column 4 to reduce the loss of hydrogen chloride by recycling it to column 4, via lines 52, 22 and 18 or by lines 52, 22, 18 and 25. The dissolved mercury may be removed from the sulfuric acid by distillation and recycled back to the reactor. The by-product sulfuric acid may be decomposed in a direct fired decomposer, not shown, and the sulfur dioxide by-product be converted to sulfur trioxide which may in turn be used to react with hydrogen chloride to produce chlorosulfonic acid.

In an alternative procedure, not shown, the reactants may be introduced into a packed column and contacted either in a co-current or countercurrent manner. For instance, the reactants may be introduced into the central portion of a packed tower provided with a reboiler in the bottom section to maintain the desired temperature in the reactor. By-product sulfuric acid leaves through the reboiler section and the chloromethane reaction products leave the top of the reactor. Reactants are restricted from leaving with chloromethane porducts overhead by a reflux condenser.

In order to more fully illustrate the nature of the invention and the manner of practicing the same, the following examples are presented.

Examples 1 and 2 demonstrate the preferred method by which the methyl chloromethyl ether is prepared according to the process of the present invention.

EXAMPLE 1

Into the top of a reactor column containing a plurality of contact trays is introduced an aqueous mixture comprising 30.7 weight percent methanol, 29 eight percent formaldehyde and 40.3 weight percent water at a rate of about 5.2 grams per minute. Hydrogen chloride gas is fed into the reactor below this point at a rate of about 3.1 grams per minute. The temperature at the column overhead is approximately 50° C. and at the column reboiler the temperature is approximately 105° C. Approximately 225 grams per hour of crude methyl chloromethyl ether is collected in the overhead fraction which corresponds to a conversion of 95% based on the methanol, formaldehyde and water introduced into the reaction system. The aqueous stream from the column reboiler analyzes about 20 weight percent hydrogen chloride.

EXAMPLE 2

In an apparatus similar to that employed in Example 1 is introduced at the top of the reactor a feed solution comprising 23.3 weight percent methanol, 22 weight percent formaldehyde, 30.6 weight percent water and 24.1 weight percent sulfuric acid at a rate of approximately 6.8 grams per minute. Hydrogen chloride gas is fed into the reactor below the point at which the feed solution is introduced at a rate of approximately 3.1 grams per minute. The temperature at the column overhead is about 50° C. and at the column reboiler the temperature is about 105° C. The overhead fraction analyzed approximately 225 grams per hour of crude methyl chloromethyl ether based on the feed solution. The aqueous stream removed from the reboiler portion of the reaction column contains approximately 9 weight percent hydrogen chloride. This is equivalent to a 40% reduction in hydrogen chloride losses in the aqueous stream from the column reboiler as compared to the hydrogen chloride loss of Example 1 in which no sulfuric acid was added to the feed.

Example 3 demonstrates the use of chlorosulfonic acid having dissolved therein minor amounts of mercury for converting methyl chloromethyl ether to methyl chloride and methylene chloride.

EXAMPLE 3

Chlorosulfonic acid is prepared by contacting 1.225 grams per minute sulfur trioxide with 1.115 grams per minute hydrogen chloride at 195° C. The resulting chlorosulfonic acid, in gaseous form, and excess hydrogen chloride is sparged into a vessel having a liquid holdup of about 100 ml. Chloromethyl methyl ether is sparged concurrently into the vessel at a rate of 0.985 grams per minute. In the vessel sulfuric acid, having dispersed therein one to four percent mercury added as mercuric chloride, is at a temperature of 150° C. The resulting mixture is introduced into a packed column, the lower portion of which is flooded and held at a temperature of 185° to 190° C. Overhead material from the packed column is collected at −40° C. and shows essentially quantitative yields of methyl chloride and methylene chloride. Underflow from the column is by-product sulfuric acid containing excess chlorosulfonic acid.

What is claimed is:

1. A process for the preparation of chloromethanes which comprises reacting hydrogen chloride and methyl chloromethyl ether in the presence of chlorosulfonic acid and a mercury salt in an amount sufficient to provide between about one part per million of mercury and 10% by weight of mercury based on the amount of chlorosulfonic acid, said mercury salt being selected from the group consisting of acetates, benzoates, bromates, bromides, carbonates, chlorates, chlorides, chromates, formates, iodates, iodides, nitrates, oxalates, sulfates and sulfides, at a temperature within the range of 80° C. to 250° C. to effect conversion of the methyl chloromethyl ether to chloromethanes.

2. The process according to claim 1 wherein said mercury salt is mercuric chloride.

3. The process according to claim 1 wherein said mercury salt is dissolved in the chlorosulfonic acid.

4. The process according to claim 1 wherein the chlorosulfonic acid contains an excess of free sulfur trioxide in an amount up to about 20% by weight.

5. The process according to claim 2 wherein the reaction temperature ranges from about 90° C. to 200° C.

References Cited

UNITED STATES PATENTS 3,067,267  12/1962  Young et al. -------- 260—657
3,360,583  12/1967  Hall et al. ---------- 260—657

OTHER REFERENCES

Mellor, Comprehensive Treatise of Theoretical and Inorganic Chemistry, vol. 10, pp. 686–687 (1930), Longmans-Green, Publishers, Call No. QD 31M4.

DANIEL D. HORWITZ, Primary Examiner